UNITED STATES PATENT OFFICE 2,615,016

METHOD OF EXTRACTING CARDIOACTIVE GLYCOSIDES FROM BOVIEA VOLUBILIS

Gerhard Schenck, Berlin-Dahlem, and Fred Rattinger, Aschaffenburg, Germany, assignors to Knoll A.-G. Chemische Fabriken, Ludwigshafen on the Rhine, Germany, a corporation of Germany No Drawing. Application March 15, 1951, Serial No. 215,868. In Germany March 20, 1950

2 Claims. (Cl. 260—210)

This invention relates to cardioactive glycosides and more particularly to cardioactive glycosides derived from the bulb of the plant Boviea volubilis, and to a method of making said glycosides.

It is already known to produce a brown amorphous powder containing cardioactive glycosides from the bulbs of Boviea volubilis. Previously, however, it was not possible to obtain therefrom a crystalline glycoside. But in the therapy of cardiac diseases it is of greatest importance to administer exact and well defined doses of the cardioactive principle. Crude preparations have to be standardized by biological methods; but said biological standardization methods are rather crude. Furthermore, said preparations contain frequently several cardioactive glycosides which often show considerable differences in absorption from the gastro-intestinal tract by oral application, in cumulative action, in emitic action and the like. These disadvantages, when using crude preparations of cardioactive drugs, can be overcome by isolating the pure cardioactive principles from said crude preparations. The production of pure cardioactive principles, furthermore, will obviate the necessity of biological standardization. To produce such pure principles, however, is a difficult undertaking. On the one hand, said glycosides are very readily split up and decomposed by various influences, for instance, by enzymes which might be present in the dry powder of the drug. On the other hand, aqueous extracts obtained from the drug contain large amounts of soluble extractive matter which hinder crystallization of said cardioactive principles and/or which change their solubility in various solvents.

Now, it is one object of this invention to provide crystalline glycosides from Boviea volubilis, said crystalline products being free from any impurities and having a definite cardiovascular activity. Said pure products allow administration of exact and well defined doses which can be adjusted in each case to the need of the patient requiring said drug. Due to the absence of impurities there is no danger that undesired side-reactions may take place.

Another object of this invention consists in providing a simple and economic method of producing said crystalline glycosides from Boviea volubilis. According to said process the dried and pulverized bulbs of Boviea volubilis are repeatedly, but only for a comparatively short time extracted with methanol. The combined extracts are concentrated by evaporation, the mucilaginous substances present in said concentrated extracts are precipitated by the addition of acetone. Thereby a solvent mixture is obtained which is capable of keeping in solution the glycosides present in said drub. One of said glycosides having a high melting point is just barely kept in solution so that it can be subjected to the subsequent treatment with aluminum oxide. By adsorption of said glycosides from their solution in a mixture of methanol and acetone and by subsequent elution with acetone or methanol respectively two glycosides can be separated and isolated in pure form. One of said glycosides which will be called hereinafter and in the claims Boviea glycoside I, is eluted from aluminum oxide by means of acetone while the other glycoside which will be called hereinafter and in the claims Boviea glycoside II, is eluted from aluminum oxide by means of methanol.

The Boviea glycoside I obtained according to this invention crystallizes in long, needle-shaped, colorless prisms and rosettes and has a melting point of 140° C. It is soluble in acetone and acetic acid ethyl ester. It shows strong reaction in the Keller-Kiliani test and has a cardiovascular activity which is equal to that of strophantin.

The Boviea glycoside II obtained according to this invention crystallizes in colorless cubes which melt above 300° C. It shows only slight reaction in the Keller-Kiliani test.

Example

Bulbs of Boviea volubilis are carefully dried at 80° C. and are then pulverized. 100 g. of said powder are boiled under reflux for about 30 minutes with 800 g. of methanol. The residue, after filtration, is again boiled under reflux for about 30 minutes with 400 g. of methanol. Filtration and boiling with 400 g. of methanol is repeated four or five times until the methanolic extract is colorless. The combined methanol filtrates are concentrated by evaporation in a vacuum to about 240 g. In order to precipitate the troublesome mucilaginous substance present in said concentrate, 200 g. of acetone are added thereto. After allowing the mixture to stand for 24 hours, the sticky and tenacious precipitate is filtered off and is thoroughly and intimately kneaded with 200 g. of acetone. The filtrate obtained from said kneading operation is used as washing liquid in the following steps of the process. The first methanol-acetone filtrate obtained on precipitating the mucilaginous substances, is allowed to run through an adsorption column filled with aluminum oxide. After said filtrate has passed through said column, the above mentioned 200 g. of washing acetone are run through thes same. Finally, as developer, 400 g. of acetone are poured upon the column. From the effluent, the Boviea glycoside I is obtained by evaporation. To further purify the same it is again subjected to adsorption on aluminum oxide and elution. Thereafter long, needle-shaped colorless prisms and rosettes of a melting point of 140° C., are obtained. The glycoside is soluble in acetone and acetic acid ethyl ester and shows strong Keller-Kiliani reaction. Its cardiovascular activity is equal to that of strophantin.

To obtain the Boviea glycoside II, the aluminum oxide column, after removing the glycoside I therefrom by means of acetone, is eluted with 1000 g. of methanol. From the effluent the glycoside II is recovered by evaporation. It is further purified by repeated adsorption on aluminum oxide and elution. In the pure state it forms colorless cubes melting above 300° C. The Boviea glycoside II shows only slight Keller-Kiliani reaction.

In order to purify the glycosides, they are dissolved in methanol and are passed again through a column of aluminum oxide. The column is then eluted with acetone in the case of glycoside I, and with methanol in the case of glycoside II. From said acetone or methanol solutions the glycosides are obtained by evaporation of the solvent. If necessary adsorption on aluminum oxide and elution with suitable solvents is repeated until crystals of said glycosides are obtained. One may, of course also use other purification methods, such as recrystallization from suitable solvents, such as acetic acid ethyl ester, or the like; but the losses with these methods are greater than when using the adsorption and elution method. Preferably absolutely water-free methanol and acetone are used as solvents. Even small amounts of water in said solvents prevent proper separation of said glycosides.

The standardization of said glycosides is carried out in a manner known per se. The Boviea glycoside I, when tested by the method of Knaffl-Lenz (Archiv. für experimentelle Pathologie und Pharmakologie, Bd. 135, Seite 275 (1928)) which involves intravenous injection into guinea pigs until death occurs by cardiac arrest, exhibits a potency of 1,725 million guinea pig units per gram. The glycoside II under same conditions exhibits a potency of 369,000 units per gram.

For this method, 20 mg. of glycoside are dissolved in 2 cc. ethylalcohol (96%); this solution is diluted with an 0.9% solution of sodium chloride up to a total volume of 20 cc.

In the human therapy the glycosides may be perorally applied in the form of tablets or of a solution in water or also as suppositories.

Boviea volubilis is a plant belonging to the class Angiospermae, family Liliaceae, group melanthoideae. It is indigenous to South Africa. It is understood that also crossings of said plant with similar plants, provided they contain cardioactive principles, may be used as starting material.

Of course, many changes and variations may be made by those skilled in the art in the extraction temperature and duration, in the amounts of solvents used, in the manner of working up the eluates and of purifying the glycosides obtained therefrom, and the like in accordance with the principles set forth herein and in the claims annexed hereto.

What we claim is:

1. A method of producing crystalline cardioactive glycosides from Boviea volubilis comprising repeatedly extracting, each time for a short period of time, dried and pulverized bulbs of Boviea volubilis with methanol, concentrating the combined extracts, precipitating the mucilaginous substances present in said concentrate by the addition of acetone, subjecting the methanol-acetone solution of the glycosides obtained thereby to adsorption on aluminum oxide, and eluting therefrom the glycosides separately.

2. In a method of producing crystalline cardioactive glycosides from Boviea volubilis according to claim 1, wherein the aluminum oxide adsorbate is eluted with acetone to remove therefrom the Boviea glycoside I, said glycoside being recovered from said acetone eluate, whereafter the aluminum oxide absorbate is eluted with methanol to remove therefrom the Boviea glycoside II, said glycoside being recovered from said methanol eluate.

GERHARD SCHENCK.
FRED RATTINGER.

REFERENCES CITED

The following references are of record in the file of this patent:

FOREIGN PATENTS

| Number | Country | Date |
|---|---|---|
| 656,260 | Germany | Feb. 1, 1938 |